Patented Jan. 2, 1945

2,366,190

UNITED STATES PATENT OFFICE 2,366,190

FILTERING LUBRICATING OILS

James E. Hurn, La Porte, Ind., assignor to The De Luxe Products Corporation, La Porte, Ind., a corporation of Indiana No Drawing. Application June 19, 1942, Serial No. 447,667

5 Claims. (Cl. 252—9)

This invention relates to an improvement in filtering lubricating oil and more particularly to a method and product for filtering so called detergent petroleum oils.

In my Patent 2,168,124 is shown an adsorption type filter for filtering lubricating oils, particularly petroleum oils, in which adsorbent cellulosic fibers are maintained in adsorbent relationship to each other by means of a support. A filter of this type removes colloidal materials from hot petroleum oil in an internal combustion engine. Recently, however, it has become the practice with certain oils, particularly for Diesel motors, to include in the oil a detergent which is usually a water insoluble metal soap such as aluminum stearate or oleate in combination with other materials. These detergents are included in order to act upon the exposed portions of the motor system with the idea of scrubbing from these portions any dirt which might otherwise adhere to them. They also have the property of scrubbing in a similar manner the impurities which have collected in the adsorption type cartridge, or, at least in many instances, of definitely retarding the action thereof. It has now been discovered that an adsorption type filter cartridge may be produced which can remove impurities from detergent petroleum oils without eliminating the detergents therefrom, either by adding a surface active composition to the filter cartridge or by adding it to the oil, from which it is adsorbed onto the cartridge fibers.

It has been discovered that cellulose compatible surface active materials, some of which are cation active in their nature and others of which are anion active in their nature, may be employed for this purpose. The cation active compounds are preferably phosphorus base materials including at least one straight chain carbon group of not substantially less than 12 carbon atoms, and including an amide group. The preferred compounds are the following:

| C. A. C. | Formula | Name |
|---|---|---|
| A | C$_2$H$_5$OP$=$O(OH)(NHC$_{12}$H$_{25}$) | Lauryl amide of ethyl phosphoric acid. |
| B | C$_2$H$_5$OP$=$O(OH)(NHC$_{18}$H$_{37}$) | Stearyl amide of ethyl phosphoric acid. |
| C | C$_{12}$H$_{25}$.N(H)—P(ONH$_3$C$_{12}$H$_{25}$)(OC$_2$H$_5$)$=$O | Lauryl amide of ethyl phosphoric acid, lauryl amine salt. |

The preferred material is cation active compound A, the lauryl amide of ethyl phosphoric acid. This material has been designated as CAC "A." It has been found that 0.25% of this compound in a detergent oil (based on the oil) or approximately 8.5% of the compound in a cellulosic cartridge (based on the weight of the cartridge) of the type shown in Hurn Patent 2,168,124 effectively improves the removal of impurities by the cartridge. For example 18 grams of CAC "A" in a cellulosic filter cartridge containing 205 grams of cotton waste when used with 15 lbs. of Del Vac No. 520 detergent oil, greatly increased the filtering efficiency. The use of 25 grams of the compound produced excellent filtration. The figures given were for filtering at 150° F.

The cation compound A produces some corrosive effect which in some circumstances is immaterial and in others may be serious. It is, therefore, preferred to use a compatible corrosion inhibitor in combination with the surface active material. The preferred corrosion resisting agents are such compounds as Lubrizol No. 714 or Lubrizol No. 728. The Lubrizol 714 is an oxidation and corrosion inhibitor with a non-metallic base. The 728 Lubrizol is a similar material with a metallic base.

Approximately 3% of the Lubrizol material is placed in the oil and the results given above were for a combination of cation compound and 3% of Lubrizol 714. Similar results have been obtained using 0.25% cation compound A with 3% Lubrizol 714 in the oil on Texaco Ursa 20 2-star detergent oil, Sinclair Tenol ES 20 detergent oil, and Conoco Detergent No. 20, although results upon the Conoco oil were based at somewhat higher temperatures.

The exact nature of the detergent compositions has not been disclosed by the manufacturers of these oils. However, a general discussion of the oils will be found in the transactions of the Society of Automotive Engineers, and the report of the address of Ulric B. Bray delivered at Tulsa on November 7 and 8, 1940, entitled "Modern lubricants for modern Diesels." In general they are oil soluble salts or soaps of carboxylic acids such as heavy metal soaps of complex acids, not necessarily fatty acids. Examples are calcium phenol stearate, calcium phenolic complexes, and methyl dichlorstearate.

Cation compound C is employed preferably in somewhat larger proportions than A. For example, 0.46% of compound C dissolved in 100 cc of alcohol was used to impregnate a filter cartridge containing approximately 207 grams of filtering material and was then used to filter 15 lbs. of Del Vac No. 520 oil at 150° F. with excellent results.

As an example of the use of the cation active compound B, 1% of B compound was used with 2 gallons of Del Vac 520 oil at 150° F. and was found to clean up the oil in about 45 minutes. In this, as in the preceding experiments, the testing composition was 0.4% of lamp black, which was found to be the most difficult to remove and which corresponds closely to the type of impurities, colloidal and otherwise, encountered in the motor.

0.85% of the B type of material in the same oil also performed well.

With all of the cation active compounds, better results were obtained by impregnating the cartridge than when merely placing the cation active compound in the oil itself. That is, the same results could be accomplished with about half of the quantity of cation active compound when impregnating the cartridge as compared with a solution of the compound in the oil. The preferred manner of impregnating is to dissolve the compound in a volatile solvent such as alcohol, impregnating the cartridge with the solution, and then evaporating the solvent at low temperature.

The corrosion inhibitor may be placed directly in the oil or the cartridge may be impregnated with it.

The amine soaps have likewise proved quite effective in overcoming the cleansing effect of detergent oils on the filter. For example, the use of 1% of triethanolamine oleate; 0.5 to 1% of triethanolamine stearate; 1% of amino ethyl propanediol stearate; 1% of amino methyl propanol stearate; and 1% 2-amino-2-methyl-1 propanol stearate; proved effective to provide ready filtration when added to detergent oil.

These materials, however, are relatively corrosive on most motor metals and do not respond readily to usual corrosion inhibitors. An excess of the organic alkali reduces the corrosion materially.

In general the amount of surface active compound employed will be at least 2.5% by weight of the cartridge fibers, and up to approximately 35%. Higher amounts may be employed but are unnecessary. When the cartridge is impregnated with the surface active compound, the maximum required quantity is generally not over 15% by weight, and the preferred range for cation active compound A is 8.5 to 12.75% of the weight of the fibers.

The minimum and preferred amounts of surface active compound employed in a given cartridge depends at least partially on the amount of oil with which the cartridge is to be employed.

The amounts used when adding the compounds to oil are preferably 0.5% to 1.0%, although less effective results have been obtained with as little as 0.25%.

The foregoing detailed description has been given for clearness of understanding only, and no unnecessary limitations should be understood therefrom.

What I claim as new, and desire to secure by Letters Patent, is:

1. An adsorption type filter cartridge comprising adsorbent cellulosic fibers adsorbently maintained, said fibers being impregnated with a surface active compound of the class consisting of lauryl amide of ethyl phosphoric acid, stearyl amide of ethyl phosphoric acid, and lauryl amide of ethyl phosphoric acid, lauryl amine salt.

2. An adsorption type filter cartridge comprising adsorbent cellulosic fibers impregnated with 2.5% to 35% of lauryl amide of ethyl phosphoric acid.

3. An adsorption type filter cartridge comprising adsorbent cellulosic fibers impregnated with 8.75% to 12.75% of lauryl amide of ethyl phosphoric acid.

4. The method of filtering detergent oils in a system including a filter cartridge of the adsorbent cellulosic fiber type which comprises introducing to the filtration system approximately 0.25% to 1% of a surface active compound of the class consisting of lauryl amide of ethyl phosphoric acid, stearyl amide of ethyl phosphoric acid, and lauryl amide of ethyl phosphoric acid, lauryl amine salt.

5. The method as set forth in claim 4, in which the surface active compound is lauryl amide of ethyl phosphoric acid.

JAMES E. HURN.